United States Patent
Byrne et al.

(10) Patent No.: US 9,911,127 B1
(45) Date of Patent: Mar. 6, 2018

(54) RATABLE VIDEO ADVERTISEMENTS

(75) Inventors: James Byrne, San Francisco, CA (US);
Maryrose Dunton, Oakland, CA (US);
Erik Klein, Sunnyvale, CA (US);
Christoform Miller, San Francisco, CA (US);
Anna Nguyen, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 826 days.

(21) Appl. No.: 12/114,403

(22) Filed: May 2, 2008

Related U.S. Application Data

(60) Provisional application No. 60/915,654, filed on May 2, 2007.

(51) Int. Cl.
*G06Q 30/02* (2012.01)

(52) U.S. Cl.
CPC ................... *G06Q 30/02* (2013.01)

(58) Field of Classification Search
CPC .. G06Q 30/02; H04N 21/812; H04N 21/4622; H04N 21/4756
USPC ....................................... 705/14.6
See application file for complete search history.

(56) References Cited

U.S. PATENT DOCUMENTS

| | | | |
|---|---|---|---|
| 5,638,523 A | 6/1997 | Mullet et al. | |
| 5,790,122 A | 8/1998 | Cecchini et al. | |
| 5,801,747 A | 9/1998 | Bedard | |
| 6,057,872 A | 5/2000 | Candelore et al. | |
| 6,091,416 A | 7/2000 | Cragun | |
| 6,097,390 A | 8/2000 | Marks | |
| 6,282,713 B1 | 8/2001 | Kitsukawa et al. | |
| 6,587,127 B1 * | 7/2003 | Leeke | G06Q 20/123 715/733 |
| 6,604,239 B1 * | 8/2003 | Kohen | G06Q 30/02 705/36 R |
| 6,698,020 B1 | 2/2004 | Zigmond et al. | |
| 7,043,746 B2 | 5/2006 | Ma | |
| 7,117,439 B2 | 10/2006 | Barrett et al. | |
| 7,356,477 B1 | 4/2008 | Allan et al. | |
| 7,519,273 B2 | 4/2009 | Lowthert et al. | |
| 7,725,502 B1 | 5/2010 | Badros et al. | |
| 7,870,023 B2 | 1/2011 | Ozer et al. | |

(Continued)

FOREIGN PATENT DOCUMENTS

| | | |
|---|---|---|
| CN | 1305158 | 7/2001 |
| CN | 1305158 A | 7/2001 |

(Continued)

OTHER PUBLICATIONS

"Ad Serving with RealSystem198 G2," RealNetworks, 1999, 38 pages, [online] [Retrieved on Feb. 13, 2009] Retrieved from the internet <URL:http://service.real.com/help/library/blueprints/adserve/adserve.htm>.

(Continued)

*Primary Examiner* — Bruce I Ebersman
(74) *Attorney, Agent, or Firm* — Foley & Lardner LLP

(57) ABSTRACT

A system, method and various user interfaces enable association of advertising content with requested shared video content for access via a web-based video player. Advertising content is provided selectively in conjunction with playback of video content. A rating system allows users to rate advertisements. Correspondence is then established between the video clips and the advertising content responsive to the selected rating.

23 Claims, 2 Drawing Sheets

(56) References Cited

U.S. PATENT DOCUMENTS

| | | | |
|---|---|---|---|
| 7,970,827 B1* | 6/2011 | Cumberbatch et al. | 709/204 |
| 8,281,332 B2 | 10/2012 | Rajaraman et al. | |
| 8,442,125 B2* | 5/2013 | Covell et al. | 375/240.26 |
| 2002/0032771 A1 | 3/2002 | Gledje | |
| 2002/0078456 A1 | 6/2002 | Hudson et al. | |
| 2002/0087402 A1* | 7/2002 | Zustak et al. | 705/14 |
| 2002/0100041 A1 | 7/2002 | Rosenberg et al. | |
| 2002/0109729 A1 | 8/2002 | Dutta | |
| 2003/0083937 A1* | 5/2003 | Hasegawa et al. | 705/14 |
| 2003/0105669 A1 | 6/2003 | Tsuchiya | |
| 2003/0188308 A1 | 10/2003 | Kizuka | |
| 2004/0117827 A1* | 6/2004 | Karaoguz et al. | 725/42 |
| 2004/0133910 A1 | 7/2004 | Gordon et al. | |
| 2004/0199657 A1 | 10/2004 | Eyal et al. | |
| 2005/0028190 A1 | 2/2005 | Rodriguez et al. | |
| 2005/0034151 A1 | 2/2005 | Abramson | |
| 2005/0137958 A1 | 6/2005 | Huber et al. | |
| 2005/0267813 A1 | 12/2005 | Monday | |
| 2006/0013555 A1 | 1/2006 | Poslinski | |
| 2006/0015904 A1 | 1/2006 | Marcus | |
| 2006/0020966 A1 | 1/2006 | Poslinski | |
| 2006/0048186 A1* | 3/2006 | Alterman | 725/45 |
| 2006/0107285 A1 | 5/2006 | Medvinsky | |
| 2006/0140584 A1 | 6/2006 | Ellis et al. | |
| 2006/0179466 A1 | 8/2006 | Pearson et al. | |
| 2006/0214947 A1 | 9/2006 | Boose et al. | |
| 2006/0218577 A1* | 9/2006 | Goodman et al. | 725/32 |
| 2006/0230427 A1* | 10/2006 | Kunkel et al. | 725/133 |
| 2006/0259588 A1 | 11/2006 | Lerman et al. | |
| 2006/0259589 A1 | 11/2006 | Lerman et al. | |
| 2006/0271977 A1 | 11/2006 | Lerman et al. | |
| 2007/0050452 A1 | 3/2007 | Raju | |
| 2007/0060129 A1 | 3/2007 | Ramer et al. | |
| 2007/0061203 A1 | 3/2007 | Ellis et al. | |
| 2007/0100699 A1* | 5/2007 | Ajizadeh | 705/14 |
| 2007/0107010 A1 | 5/2007 | Jolna et al. | |
| 2007/0118802 A1* | 5/2007 | Gerace et al. | 715/738 |
| 2007/0130015 A1* | 6/2007 | Starr et al. | 705/14 |
| 2007/0174774 A1 | 7/2007 | Lerman et al. | |
| 2007/0180478 A1 | 8/2007 | Doi et al. | |
| 2007/0183741 A1 | 8/2007 | Lerman et al. | |
| 2007/0189708 A1 | 8/2007 | Lerman et al. | |
| 2007/0198339 A1 | 8/2007 | Shen et al. | |
| 2007/0226053 A1* | 9/2007 | Carl et al. | 705/14 |
| 2007/0239546 A1 | 10/2007 | Blum et al. | |
| 2008/0021775 A1 | 1/2008 | Lerman et al. | |
| 2008/0109306 A1* | 5/2008 | Maigret et al. | 705/14 |
| 2008/0109844 A1* | 5/2008 | Baldeschwieler et al. | 725/35 |
| 2008/0127280 A1* | 5/2008 | Kuang et al. | 725/86 |
| 2008/0147500 A1* | 6/2008 | Slaney et al. | 705/14 |
| 2008/0155585 A1 | 6/2008 | Craner et al. | |
| 2008/0172413 A1* | 7/2008 | Chiu | 707/104.1 |
| 2008/0250447 A1 | 10/2008 | Rowe et al. | |
| 2008/0270389 A1* | 10/2008 | Jones et al. | 707/5 |
| 2008/0307454 A1 | 12/2008 | Ahanger et al. | |
| 2009/0013252 A1 | 1/2009 | DeWitt | |
| 2009/0030802 A1 | 1/2009 | Plotnick et al. | |
| 2009/0138904 A1 | 5/2009 | Kitsukawa et al. | |
| 2009/0149743 A1 | 6/2009 | Barron et al. | |
| 2009/0199230 A1* | 8/2009 | Kumar et al. | 725/32 |
| 2009/0299824 A1* | 12/2009 | Barnes, Jr. | 705/10 |
| 2010/0063877 A1* | 3/2010 | Soroca et al. | 705/14.45 |
| 2010/0115559 A1 | 5/2010 | Ellis | |
| 2010/0198697 A1* | 8/2010 | Brown et al. | 705/14.73 |
| 2011/0023060 A1* | 1/2011 | Dmitriev et al. | 725/34 |
| 2011/0119700 A1 | 5/2011 | Hamilton | |
| 2012/0072960 A1 | 3/2012 | Rosenberg et al. | |
| 2013/0185747 A1 | 7/2013 | Candelore et al. | |

FOREIGN PATENT DOCUMENTS

| | | |
|---|---|---|
| JP | 2002-063452 A | 2/2002 |
| JP | 2002-094964 A | 3/2002 |
| JP | 2002-111610 A | 4/2002 |
| JP | 2002-314912 A | 10/2002 |
| JP | 2002-534017 A | 10/2002 |
| JP | 2004-240492 A | 8/2004 |
| JP | 2005-006105 A | 1/2005 |
| JP | 2005-073003 A | 3/2005 |
| WO | WO 2007/047645 A1 | 4/2007 |
| WO | WO 2008/033944 | 3/2008 |

OTHER PUBLICATIONS

*AJAX Activity Indicators*, Archived on Dec. 25, 2006 on www.web.archive.org [Online] [Retrieved on Jun. 10, 2008, Retrieved from the Internet <URL:http://web.archive.org/web/20061225134638/http://www/napyfab.com/ajax-indicators/>.

Delaney, Kevin J., *Start-ups seek to cash in on Web-Video Ads*, Wall Street Journal, Mar. 2, 2007, [Online] [Retrieved Sep. 3, 2008] Retrieved from the Internet <URL: http://www.scanscout.com/wsj-070302.html>.

"Overlay & Video AdType," ScanScout, 2007, [online] [Retrieved on Jul. 15, 2008] Retrieved from the internet <URL:://demo.scanscout.com/livedemo.shtml?adType=overlay&videoAdType=rightSide&ss . . . >.

Riley, D., "Contextual In-Video Advertising: ScanScout," May 14, 2007, [online] [Retrieved on Jul. 15, 2008] Retrieved from the internet <URL://www.techcrunch.com/2007/05/14/contextual-in-video-advertising-scanscout/>.

Strange, A., "VideoEgg Exec: YouTube's New Ads Are Just Like Ours," Wired Blog Network, Aug. 22, 2007, [online] [Retrieved on Jul. 15, 2008] Retrieved from the internet <URL:http://blog.wired.com/business/2007/08/network-wars-vi.html>.

PCT International Search Report and Written Opinion, PCT/US08/62103, dated Aug. 26, 2008, 9 Pages.

PCT International Search Report and Written Opinion, PCT/US08/62442, dated Jul. 14, 2008, 9 Pages.

Berg, J., "Google AdSense to Benefit YouTube," iMedia Connection, Oct. 10, 2006, 1 pages, [online] [retrieved on Mar. 22, 2010] Retrieved from the Internet <URL:http://www.imediaconnection.com/content/11634.imc>.

"Idea: How to Put Ads into YouTube," www.adverlab.blogspot.com, Nov. 22, 2006, 1 page, [online] [retrieved on Mar. 22, 2010] Retrieved from the Internet <URL:http://adverlab.blogspot.com/2006/11/idea-how-to-put-ads-intoyoutube.html>.

Anonymous: "Improved Ads for YouTube 1-15 Videos—Overlay Advertising," www.vlogblog.com, Aug. 22, 2007, 1 page, [online] [retrieved on Mar. 24, 2010] Retrieved from the Internet <URL:http://www.vlogblog.com/index.php/arch ives/2007/08/22/improved-ads-for-youtube-videos-overlay-advertising/>.

Supplementary European Search Report for European Patent Application No. EP 08747251, dated Apr. 20, 2010, 9 pages.

Office Action of the European Patent Office for European Patent Application No. EP 08755012.5, dated Aug. 30, 2010, 3 pages.

Supplementary European Search Report for European Patent Application No. EP 08755012.5, dated Apr. 20, 2010, 9 pages.

Third Office Action for Chinese Patent Application No. 200880019963.9, dated Jan. 18, 2013, 12 Pages.

Examiner's First Report on Australian Patent Application No. 2008247732, dated Jul. 13, 2011, 3 pages.

First Office Action for Chinese Patent Application No. 200880019963.9, dated May 6, 2011, 15 Pages.

First Office Action for Chinese Patent Application No. 200880019399.0, dated Apr. 25, 2011, 11 Pages.

Van Buren, S., "YouTube's external video player = seductive user interface design." A Matter of Degree, A Microsoft SharePoint/Information Architecture/Web Usability blog, Dec. 27, 2006, 2 pages, [online] [retrieved on Feb. 26, 2011] Retrieved from the Internet <URL: http://amatterofdegree.typepad.com/a_matter_of_degree/2006/12/youtubes_extern.html>.

"How to Embed Windows Media Files," MediaCollege, Nov. 24, 2005, 1 page, [online] [retrieved on Feb. 26, 2011] Retrieved from the Internet <URL:http://web.archive.org/web/20051124210305/http://www.mediacollege.com/video/format/windows-media/streaming/embed.html>.

(56) References Cited

OTHER PUBLICATIONS

Examiner's First Report on Australian Patent Application No. AU 2008247579, dated Mar. 19, 2012, 3 Pages.
Second Office Action for Chinese Patent Application No. CN 200880019399.0, dated Apr. 23, 2012, 12 Pages.
Second Office Action for Chinese Patent Application No. CN 200880019963.9, dated Apr. 26, 2012, 6 Pages.
Notice of Grounds for Rejection for Japanese Patent Application No. P2010-506678, dated Nov. 20, 2012, 6 Pages.
Notice of Grounds for Rejection for Japanese Patent Application No. P2010-506620, dated Nov. 13, 2012, 16 Pages.
Oshiba, T., "Personalized Streaming Advertisement Delivering through Internet Broadcasting Services," The 64th Information Processing Society of Japan National Convention Collected Lecture Papers, Mar. 12, 2002, pp. 3-59 to 3-60. With English Summary.
$4^{th}$ Office Action for Chinese Patent Application No. CN 200880019963.9, dated Sep. 22, 2013, 11 Pages.
Youtube, "Quebec Polar Bears" Archived on www.web.archive.org on Jul. 21, 2006, 3 Pages [online] [Retrieved on Dec. 2, 2013] Retrieved from the Internet <URL:http://web.archive.org/web/20060721035730/http://www.youtube.com/w/Quebec-Polar-Bears?v=DUGha_BOnCM>.
Communication Pursuant to Article 94(3) EPC for European Patent Application No. EP 08755012.5, dated Feb. 25, 2013, 8 pages.
Sandoval, G., "YouTube: Too rough for advertisers?" News.com Apr. 21, 2006, 2 pages, can be retrieved at <URL:http://www.news.com/YouTube-Too-rough-for-advertisers/2100-1024_3-6063536.html>.
Rejection Decision for Chinese Patent Application No. CN 200880019963.9, dated Apr. 14, 2014, 12 Pages.
Chitu, A., "Google Video with Post-Roll Ads," Google Operating System, Oct. 24, 2006, 2 pages [online] [Retrieved on Apr. 24, 2014] Retrieved from the internet <URL:http://googlesystem.blogspot.jp/2006/10/google-video-with-post-roll-ads.html>.
"Review summary of the mechanism seen in video-sharing site," Simple*Simple, Nov. 8, 2006, 12 pages, [online] [Retrieved on Apr. 30, 2014] Retrieved from the internet <URL:http://www.simplexsimple.com/archives/2006/11/post_11.html>.
Communication Pursuant to Article 94(3) EPC for European Patent Application No. EP 08747251.0, dated Apr. 29, 2015, 6 Pages.
Summons to Attend Oral Proceedings Pursuant to Rule 115(1) EPC for European Patent Application No. EP08755012.5, Aug. 20, 2015, 6 Pages.
Dodge, D., "Don Dodge on the Next Big Thing," Google tests ads on video site, Jun. 23, 2006, 2 Pages [online] [retrieved on Aug. 7, 2015] retrieved from the Internet <URL:http://dondodge.typepad.com/thenext_big_thing/2006/06/google_tests_ad.html>.
Chinese Board Opinion on 200880019963.9 dated Mar. 28, 2016.
U.S. Office Action on U.S. Appl. No. 13/598,354 dated Feb. 16, 2016.

\* cited by examiner

RATABLE VIDEO ADVERTISEMENTS

CROSS-REFERENCE TO RELATED APPLICATIONS

This application claims the benefit of U.S. Provisional Application 60/915,654, filed on May 2, 2007, and incorporated by reference herein in its entirety.

TECHNICAL FIELD

The present invention relates generally to web-based video display and specifically to user interface features for managing video and advertising content in an online content distribution system.

BACKGROUND

The sharing of video content on websites has developed into a worldwide phenomenon, supported by dozens of websites. On average, over 10,000 videos are posted every day, and this number is increasing as the tools and opportunities for capturing video become easy to use and more widespread. Shared video content provides good opportunities to present advertising material to viewers along with the requested video content. However, some mechanisms for delivering advertising with shared video have been relatively ineffective, while others are perceived by users as being objectionable.

People who use video sharing services have a wide range of motivations for using those services. Some are interested in specific information in the shared content, while others are just browsing in a leisurely manner through the content. Advertising that appears in conjunction with the video content, in order to be effective as well as maintain a satisfactory experience for the user, needs to be presented in a manner that takes these widely varying user characteristics into account.

Video content is now delivered to users via a wide range of technologies, each of which has established mechanisms for delivering advertising content. Movies commercially released in DVD format, for example, generally come with trailers for other movies from the same production company. These trailers are often presented automatically when the user seeks to watch the primary program; sometimes it is difficult if not impossible for a user to avoid watching the advertising content. Many users have expressed dismay at the requirement to sit through undesired advertisements, particularly after they have already paid a substantial amount to buy the DVD. Furthermore, the advertising content is often out of date when the DVD is watched some period of time after it is first released. The overall user satisfaction with this sort of advertising has been mixed.

More recently, major television networks have made available some of their programming on their websites. The players that they use typically require a viewer to watch advertising content before, during or after the requested programming. Initial reactions from such websites have also been mixed.

There remains a need for a flexible interface that allows requested video content and advertising to be presented in a manner that is both satisfying to the viewer and effective for advertisers.

SUMMARY

Various systems, methods and software tools enable users who are viewing videos on a website to control certain aspects of their playback experience, and also enable the content provider to provide advertising content in an effective manner.

In one aspect, an advertising control subsystem associates advertising from an advertising database with video content and provides output indicative of ratings that prior users have given to the advertising.

In a second aspect, video clips are presented to a user together with a navigation control and a rating control. The navigation control is responsive to a user selecting to present advertising content. The rating control is responsive to a user selecting a rating for the advertising content. Correspondence is then established between the video clips and the advertising content responsive to the selected rating.

In another aspect, a first window is presented corresponding to shared video content, a second window is presented corresponding to advertising content, and a ratings interface is presented operable to rate the advertising content.

In yet another aspect, a subset of video clips is grouped with a subset of advertisements responsive to a ratings history of the subset of video clips and the subset of advertisements.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DESCRIPTION OF EMBODIMENTS

It is to be understood that the Figures and descriptions of the present invention have been simplified to illustrate elements that are relevant for a clear understanding of the present invention, while eliminating, for the purpose of clarity, many other elements found in a typical web-based video player and method of using the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Figure 1:
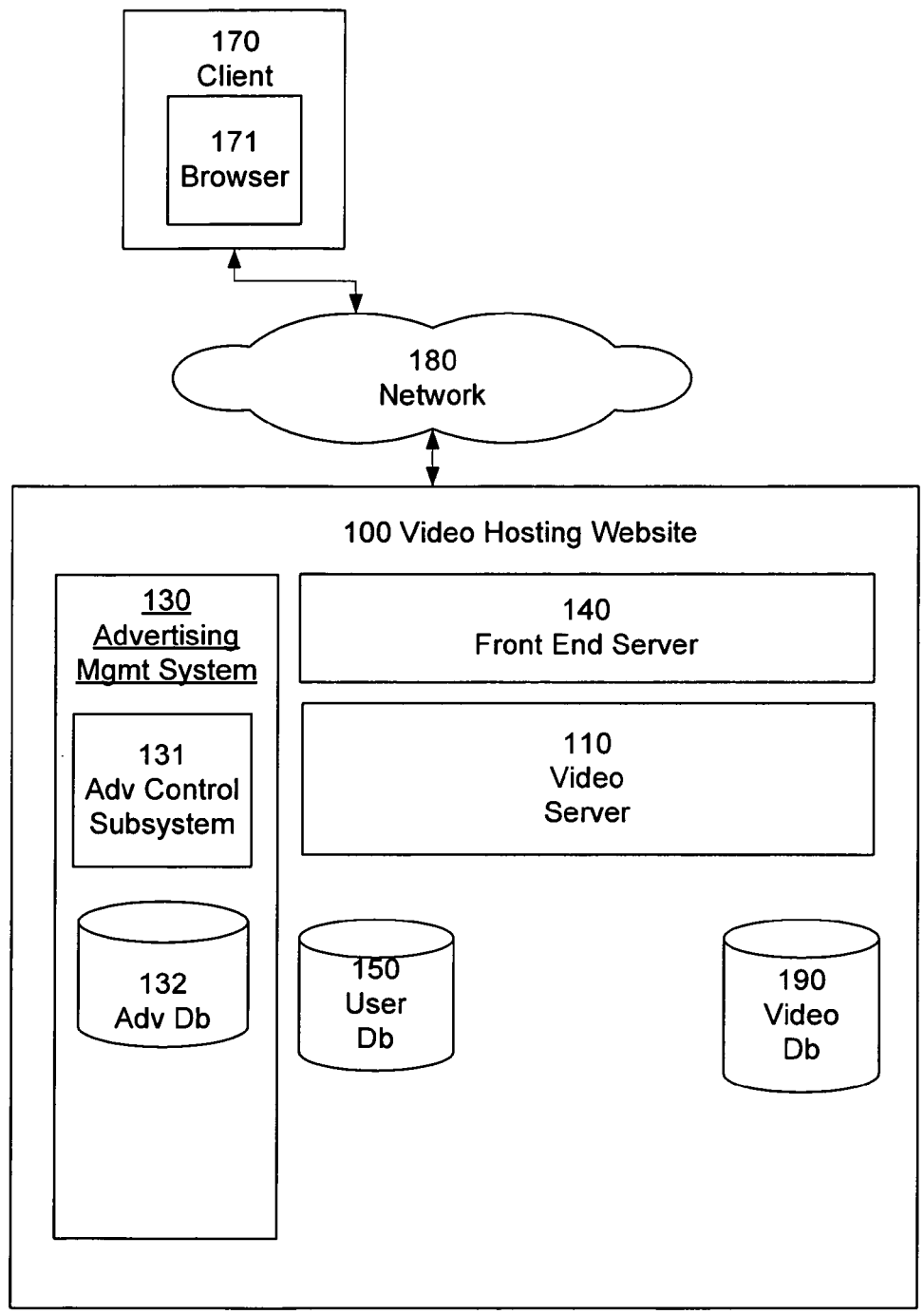
FIG. 1 is a block diagram of a system architecture for providing user interfaces for displaying both advertising and video content.

FIG. 1 is a block diagram of a system architecture in accordance with one embodiment. As shown in FIG. 1, a video hosting website 100 includes a front end server 140, an advertising management system 130, a video server 110 and various databases, including a user database 150 and a video database 190. Many conventional features, such as firewalls, load balancers, application servers, failover servers, site management tools, and so forth are not shown so as to more clearly illustrate the features of the system. A suitable website 100 for implementation of the system is the YOUTUBE™ website, found at www.youtube.com; other video hosting sites are known as well, and can be adapted to operate according to the teaching disclosed herein. It will be understood that the term "web site" represents any method of uploading and downloading content and is not intended to be limited to content uploaded or downloaded via the Internet or the HTTP protocol. The various servers are conventionally implemented, whether as a single piece of software or hardware or as multiple pieces of software or hardware. In general, functions described in one embodiment as being performed on the server side can also be performed on the client side in other embodiments if appropriate.

A client 170 executes a browser 171, and connects to the front end server 140 via a network 180, which is typically the Internet, but may also be any network, including but not limited to a LAN, a MAN, a WAN, a mobile, wired or wireless network, a private network, or a virtual private network. While only a single client 170 and browser 171 are shown, it is understood that very large numbers (e.g., millions) of clients are supported and can be in communication with the website 100 at any time. In some embodiments, the browser 171 include a third party video player (e.g., the Flash™ player from Adobe Systems, Inc.), or any other player adapted for the video file formats used in the site 100. Typically, a user accesses a video from the site 100 by browsing a catalog of videos, conducting searches on keywords, reviewing playlists from other users or the system administrator (e.g., collections of videos forming channels), or viewing videos associated with particular user groups (e.g., communities). In some embodiments, browser 171 also accesses a video file indirectly, via an embedded video that is accessed via an embedded hyperlink in a third party website.

Users of the client 170 and browser 171 can upload content (which can include, for example, video, audio, or a combination of video and audio) to the site 100 via the network 180. The uploaded content is processed and placed for storage in the video database 190. This processing can include format conversion, compression, metadata tagging, and other data processing. In some embodiments, an uploaded content file is associated with the uploading user, and so the user's account record is updated in the user database 150 as needed. In some embodiments, other data relating to the user is also placed for storage in database 150. For example, the user may be asked to self-select certain categories or product/service types of interest, for the purpose of allowing the user to self-select various types of content and advertising that the website 100 presents to the user.

For purposes of convenience and the description of one embodiment, the uploaded content will be referred to a "videos" or "video files", but no limitation on the types of content that can be uploaded are intended by this terminology.

Figure 2:
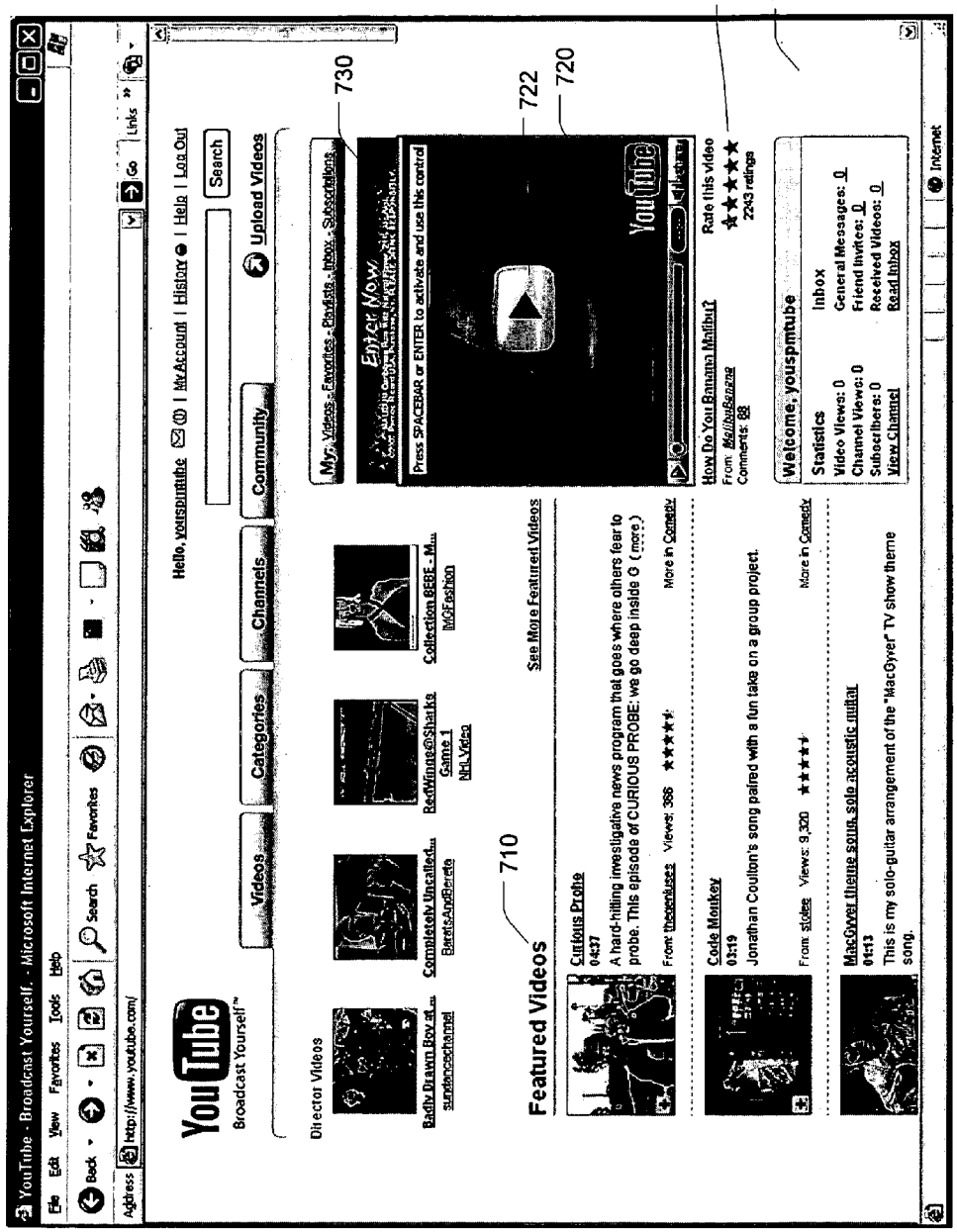
FIG. 2 illustrates an exemplary interface for a video website with integrated advertising content.

The advertising management system 130 stores advertising content to be presented along with the user-requested content. In some instances, the advertising content is in the same format as the user-requested content (e.g., video advertising for a video content request). In other instances, other types of advertising are presented to the user, such as pure text advertising, advertising providing a hyperlink to an advertiser's website, text-and-audio advertising, and still image advertising. An advertising control subsystem 131 both manages access to the advertising content stored in the advertising database 132, and also serves to associate certain advertising content with certain user-requested content. In one embodiment, the association is made solely on the content of the requested video, while in another the association is made based on other factors as well, such as user-specific information stored in the user database 150. Thus, a user who has self-identified as wanting to learn more about new movies may be presented with a greater frequency of movie-oriented advertising content than a user who had not indicated such a preference. In one embodiment, advertising database 132 also stores information indicative of ratings that prior users have given to the advertising Referring now to FIG. 2, an interface 700 for a shared video playback website integrates advertising controls with other content. As illustrated in FIG. 2, along with the website's selection of featured videos 710 is a window 720 representing video advertising content, playable by the user through activation of a prominent "play" button 722. Window 720 provides control features including a slider bar and loudspeaker icon, and further permits the advertising video to be rated using a one-to-five star rating system 750 in the same way that the other videos, e.g., the featured videos 710, are rated. While the user interface allowing rating for shared videos and advertising videos is similar, the uses to which the ratings are put may be very different. For example, ratings for shared videos may be used to determine whether they are included in a "most popular" listing or as featured videos 710. Advertisements may also be viewed on a "most popular advertisement" page or list or their popularity ratings may be included on the popularity page or list with regular videos. In each case, including advertisements on a popularity page or list affords additional opportunities for a user to view the advertisements. Thus, a rating system for advertisements provides an opportunity for additional viewing and creates excitement around particularly popular advertisements. Advertising ratings also may be used to provide feedback to advertisers, to determine whether certain ads are preferred by certain user profiles and characteristics (if known). For example, people who watch music videos and prefer humorous ads may prefer humorous ads that include music. As another example, if people who watch videos with broad humor give low ratings to a particular ad, then that is a sign that the ad may not be popular in a particular target demographic. As shown in FIG. 2, in addition to an advertising video 720, interface 700 also includes an image advertising portion 730. In one embodiment, clicking on the image advertising portion 730 links to a website related to the advertising video 720. In another embodiment the image advertising portion 730 is not related to the advertising video 720. The area 730 may be offered first to the advertiser who provides the video 720 and offered to others if that advertiser chooses not to use the location 730.

The above described interface and related methods are readily customized by an administrator to best address a particular application, and are further customizable to respond as more knowledge is obtained concerning what experiences viewers most enjoy and what modes of presenting information are most helpful to advertisers. In some embodiments, advertisers themselves can reserve locations and schedule play times on the web page for their ads. For example, an advertiser may decide to run his video ad at certain times of the day, when certain videos or categories of video are shown or when certain categories of users are viewing the page.

In FIG. 2, the video ad user interface includes a title ("How do you banana Malibu"), a source ("From: Banana-Malibu"), an opportunity for users to provide comments (both written comments and video comments) and a total number of people who have rated the video, and a share button that allows a user to forward a link to the advertisement to other users. The share button therefore affords additional viewing opportunities. Various implementations may use some or all of these elements. Some embodiments provide a user interface to control volume (as shown here by the loudspeaker icon). Some embodiments allow a user to mark an advertisement video as a favorite or to subscribe to a channel of advertisements from the same source, about similar topics, or from a user-selected list of advertisers. In such implementations, advertisers can choose whether to participate in channel feeds and the like, either globally or on a per video basis. In some implementations, advertisement videos are available only for a limited time, even when favorited. In various embodiments, this limited time may be determined by the system or set by the advertiser.

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A method of presenting information on a display, comprising:
   transmitting, by a server to a client device over a data network, a user-requested video for display on a first portion of a website responsive to a request from a user;
   selecting a video advertisement based on content of the user-requested video and user-specific information stored in a user database, the user-specific information including a user-selected category of interest;
   transmitting, by the server to the client device over the data network, the selected video advertisement for display on a second portion of the website;
   transmitting, by the server to the client device over the data network, a navigation control, selection of the navigation control causing the client device to commence playback of the selected video advertisement, wherein the navigation control comprises a playback control superimposed on the second portion of the website;

transmitting, by the server to the client device over the data network, an advertisement rating control for display on a third portion of the website and for receiving from the user an advertisement rating for the selected video advertisement;

receiving by the server from the client device over the data network, an advertisement rating for the selected video advertisement;

establishing, by the server, correspondence between the user-requested video and the video advertisement based on the received advertisement rating;

establishing, by the server, correspondence between the user-selected category of interest and the video advertisement based on the received advertisement rating;

providing, by the server, feedback to advertisers regarding the correspondence between the user-requested video and the video advertisement or the correspondence between the user-selected category of interest and the video advertisement.

2. The method of claim 1, further comprising marking the video advertisement as a featured advertisement based on the advertisement rating.

3. The method of claim 1, wherein the first portion of the web site is not superimposed with a visible playback control.

4. The method of claim 1, further comprising presenting a third portion of the web site with still image advertising.

5. The method of claim 4, wherein the still image advertising is related in content to the video advertisement.

6. The method of claim 5, further comprising presenting a web page related in content to the still image advertising responsive to user selection of the still image advertising.

7. The method of claim 1, further comprising determining an of-interest demographic for the video advertisement based on correspondence between user profiles and ratings assigned to the video advertisement.

8. The method of claim 1, wherein selecting the video advertisement is further based on ratings assigned to the video advertisement by other users having similar user profiles to the user.

9. The method of claim 1, further comprising:
presenting, by the client device, an overall advertisement rating for the video advertisement concurrently with the video advertisement; and
presenting, by the client device, a number of the plurality of other users that have rated the video advertisement, the number displayed concurrently with the video advertisement and the overall advertisement rating.

10. The method of claim 1, further comprising:
presenting, by the client device, a comments control for allowing the user to provide written or video comments regarding the video advertisement; and
presenting, by the client device, a share button for forwarding a link to the video advertisement.

11. The method of claim 1, further comprising:
transmitting by the server to the client device, a video rating control for receiving from the user a video rating for the user-requested video;
determining most popular shared videos based on the video rating from the user for the user-requested video and video ratings from a plurality of other users;
determining most popular video advertisements based on the advertisement rating from the user and from a plurality of other users; and
presenting the most popular shared videos and the most popular video advertisements in a common list of most popular videos.

12. A non-transitory computer-readable storage medium storing instructions for presenting information on a display, the instructions when executed by a processor causing the processor to perform steps comprising:
transmitting, by a server to a client device over a data network, a user-requested video for display on a first portion of a website responsive to a request from a user;
selecting a video advertisement based on content of the user-requested video and user-specific information stored in a user database, the user-specific information including a user-selected category of interest;
transmitting, by the server to the client device over the data network, the selected video advertisement for display on a second portion of the website, wherein the navigation control comprises a playback control superimposed on the second portion of the website;
transmitting, by the server to the client device over the data network, a navigation control, selection of the navigation control causing the client device to commence playback of the selected video advertisement;
transmitting, by the server to the client device over the data network, an advertisement rating control for display on a third portion of the website and for receiving from the user an advertisement rating for the selected video advertisement;
receiving by the server from the client device over the data network, an advertisement rating for the selected video advertisement
establishing, by the server, correspondence between the user-requested video and the video advertisement based on the received advertisement rating;
establishing, by the server, correspondence between the user-selected category of interest and the video advertisement based on the received advertisement rating;
providing, by the server, feedback to advertisers regarding the correspondence between the user-requested video and the video advertisement or the correspondence between the user-selected category of interest and the video advertisement.

13. The non-transitory computer-readable storage medium of claim 12, further comprising instructions for:
transmitting by the server to the client device, a video rating control for receiving from the user a video rating for the user-requested video;
determining most popular shared videos based on the video rating from the user for the user-requested video and video ratings from a plurality of other users;
determining most popular video advertisements based on the advertisement rating from the user and from a plurality of other users; and
presenting the most popular shared videos and the most popular video advertisements in a common list of most popular videos.

14. The non-transitory computer-readable storage medium of claim 12, further comprising marking the video advertisement as a featured advertisement based on the advertisement rating.

15. The non-transitory computer-readable storage medium of claim 12, further comprising superimposing a play button on the second portion of the web site.

16. The non-transitory computer-readable storage medium of claim 12, wherein the first portion of the web site is not superimposed with a visible playback control.

17. The non-transitory computer-readable storage medium of claim 12, further comprising presenting a third portion of the web site with still image advertising.

18. The non-transitory computer-readable storage medium of claim 17, wherein the still image advertising is related in content to the video advertisement.

19. The non-transitory computer-readable storage medium of claim 16, further comprising presenting a web page related in content to the still image advertising responsive to user selection of the still image advertising.

20. The non-transitory computer-readable storage medium of claim 12, further comprising determining an of-interest demographic for the video advertisement based on correspondence between user profiles and ratings assigned to the video advertisement.

21. The non-transitory computer-readable storage medium of claim 12, wherein selecting the video advertisement is further based on ratings assigned to the video advertisement by other users having similar user profiles to the user.

22. The non-transitory computer-readable storage medium of claim 12, further comprising instructions for:
   presenting, by the client device, an overall advertisement rating for the video advertisement concurrently with the video advertisement; and
   presenting, by the client device, a number of the plurality of other users that have rated the video advertisement, the number displayed concurrently with the video advertisement and the overall advertisement rating.

23. The non-transitory computer-readable storage medium of claim 12, further comprising instructions for:
   presenting, by the client device, a comments control for allowing the user to provide written or video comments regarding the video advertisement; and
   presenting, by the client device, a share button for forwarding a link to the video advertisement.

* * * * *